US009478000B2

(12) United States Patent
Rao et al.

(10) Patent No.: US 9,478,000 B2
(45) Date of Patent: Oct. 25, 2016

(54) SHARING NON-PAGE ALIGNED MEMORY

(71) Applicant: INTEL CORPORATION, Santa Clara, CA (US)

(72) Inventors: Jayanth Rao, Folsom, CA (US); Pavan Lanka, Folsom, CA (US); Ronald Silvas, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 14/039,495

(22) Filed: Sep. 27, 2013

(65) Prior Publication Data

US 2015/0091924 A1    Apr. 2, 2015

(51) Int. Cl.
  *G06T 1/60* (2006.01)
  *G06T 1/20* (2006.01)
  *G06F 12/02* (2006.01)

(52) U.S. Cl.
  CPC .............. *G06T 1/60* (2013.01); *G06F 12/0284* (2013.01); *G06T 1/20* (2013.01); *G06F 2212/251* (2013.01); *G06T 2200/28* (2013.01)

(58) Field of Classification Search
  CPC .................................. G06T 1/20; G06T 1/60
  See application file for complete search history.

(56) References Cited

U.S. PATENT DOCUMENTS

| | | | | | |
|---|---|---|---|---|---|
| 5,519,829 | A | * | 5/1996 | Wilson | G06F 12/0207 345/505 |
| 5,774,133 | A | * | 6/1998 | Neave | G06T 17/00 345/441 |
| 5,781,927 | A | * | 7/1998 | Wu | G06F 13/18 345/503 |
| 6,018,354 | A | * | 1/2000 | Jones | G06F 12/0207 345/531 |
| 2003/0210248 | A1 | | 11/2003 | Wyatt | |
| 2005/0050295 | A1 | * | 3/2005 | Noel | G06F 12/08 711/206 |
| 2006/0095611 | A1 | | 5/2006 | Winchester et al. | |
| 2006/0155886 | A1 | * | 7/2006 | da Silva | G06F 12/08 710/5 |
| 2008/0303833 | A1 | * | 12/2008 | Swift | G06T 15/005 345/505 |
| 2010/0017578 | A1 | * | 1/2010 | Mansson | G06F 12/023 711/171 |
| 2010/0030975 | A1 | * | 2/2010 | Murray | G06F 8/52 711/154 |
| 2010/0118041 | A1 | | 5/2010 | Chen et al. | |
| 2010/0214301 | A1 | * | 8/2010 | Li | G06T 1/20 345/522 |
| 2012/0092356 | A1 | * | 4/2012 | Jiao | G06T 1/60 345/541 |

FOREIGN PATENT DOCUMENTS

EP           2854030 A     4/2015
WO     2013091185 A1     6/2013

OTHER PUBLICATIONS

Rao, et al., U.S. Appl. No. 13/588,308 , filed Aug. 17, 2012, 37 pages.
Rao, et al., U.S. Appl. No. 13/588,453, filed Aug. 17, 2012, 36 pages.

* cited by examiner

*Primary Examiner* — Charles Tseng
(74) *Attorney, Agent, or Firm* — International IP Law Group, P.L.L.C.

(57) ABSTRACT

A method for sharing memory between a central processing unit (CPU) and an input/output (I/O) device of a computing device is described. The method may include creating an allocation of memory for the I/O device to operate on. The method includes detecting whether the allocation is not page-aligned, wherein an allocation is page-aligned when its base address and size be evenly divisible by the applicable page-size. The allocation may be successfully shared, even if not page-aligned, even if an operating system of the computing device doesn't support sharing of non-page-aligned allocations.

21 Claims, 9 Drawing Sheets

SHARING NON-PAGE ALIGNED MEMORY

BACKGROUND ART

Computing devices and their operating systems often manage memory at a level of granularity greater than their smallest addressable element—i.e., they divide the device's memory address spaces into fixed-sized blocks, called "pages". Memory addresses evenly divisible by the page-size are called "page boundaries". Operating systems often use page-granular management at certain levels while doing finer-grained management at other levels. In some cases, fine-grain allocations don't necessarily begin and/or end on page boundaries. Operating systems often allow system memory to be shared with GPU devices—but such implementations tend to only support such sharing at page granularity, rather than fine-grain allocations including allocations that do not being and/or end on page boundaries.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
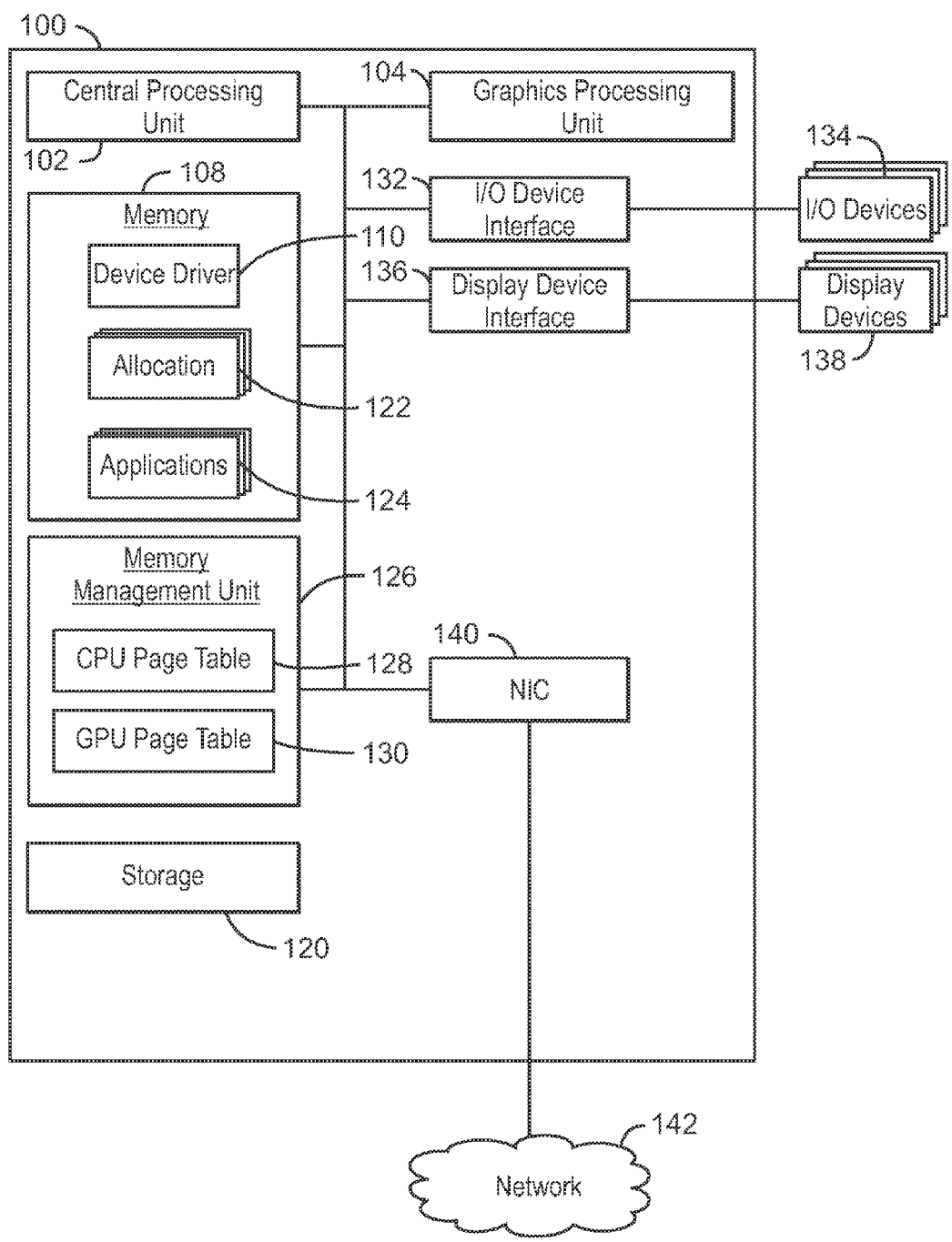
FIG. 1 is a block diagram of a computing device that may be used in accordance with embodiments.

In embodiments, a unified memory architecture (UMA) enables memory sharing between the CPU and GPU by providing both the CPU and the GPU with the same physical memory. Thus, the physical memory and the corresponding physical address space of the CPU and GPU are one and the same. In some cases, the physical memory may be partitioned between the CPU and the GPU. Further, the physical memory can be implemented as a paged system memory that is allocated by an operating system of the computing device. A paged virtual memory address space of the CPU may be mapped to the same physical memory pages as the graphics virtual memory address space of the GPU. However, the operating system restricts the GPU to accessing page aligned system memory allocations. Computing languages such as OpenCL may provide application programming interfaces (API's) to enable the GPU to access non-page aligned system memory allocations. OpenCL may also provide API's that enable data to be copied between the separate physical address domains of the CPU and the GPU so that non-page aligned data can be operated on by the GPU. In such a scenario, after the GPU has finished processing a set of data, the data is copied back to the physical address domain of the CPU. The data transfers that occur when using OpenCL to copy data between the separate physical address domains of the CPU and the GPU may reduce any efficiency gained by offloading tasks to the GPU. Accordingly, embodiments described herein relate to the sharing of non-page aligned system memory between the CPU and the GPU of a computing device. The memory may be shared via a unified memory architecture (UMA). Non-page aligned buffers of the UMA may re-use the same backing or underlying physical memory, regardless of restrictions imposed by the operating system.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infra-red signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used in accordance with embodiments. The computing device 100 may be, for example, a laptop computer, desktop computer, tablet computer, mobile device, or server, among others. The computing device 100 may include a central processing unit (CPU) 102 that is adapted to execute stored instructions, as well as a memory device 108 that stores instructions that are executable by the CPU 102. The CPU 102 can be a single core processor, a multi-core processor, a computing cluster, or any number of other configurations. Furthermore, the computing device 100 may include more than one CPU 102. The instructions that are executed by the CPU 102 may be used to implement a memory sharing procedure.

The computing device 100 may also include a graphics processing unit (GPU) 104. As shown, the CPU 102 may be connected through a bus 106 to the GPU 104. However, in some embodiments, the GPU 104 is located on the same die as the CPU 102 within the computing device 100. In this manner, the CPU 102 and the GPU are physically connected in such a manner that the connection between the CPU 102 and the GPU 104 via the bus 106 may be eliminated. Furthermore, in embodiments, the CPU 102 and the GPU 104 may be included within a unified memory architecture of the computing device 100, as discussed with respect to FIG. 2.

The GPU 104 may be configured to perform any number of graphics operations within the computing device 100. For example, the GPU 104 may be configured to render or manipulate graphics images, graphics frames, videos, or the like, to be displayed to a user of the computing device 100. In some embodiments, the GPU 104 includes a number of graphics engines (not shown), wherein each graphics engine is configured to perform specific graphics tasks, or to execute specific types of workloads.

The computing device 100 may also include a memory device 108. The memory device 108 can include random access memory (RAM), read only memory (ROM), flash memory, or any other suitable memory systems. For example, the memory device 108 may include dynamic random access memory (DRAM). The memory 108 may include device drivers 110 that are configured to execute the instructions for implementing the memory sharing procedure. The device drivers 110 may be configured to execute instructions for reducing corruption of the system memory.

The device drivers 110 may be software, an application program, application code, or the like. In embodiments, a device driver 110 is a graphics driver that is embedded with functionality that implements the memory sharing procedure for non-page aligned memory. The device driver 110 may include a user-mode module. The user-mode module of a device driver enables the device driver 110 to execute in the user-mode space of a computing system, rather than in the privileged space of the kernel mode. By executing in the user-mode, the device driver 110 may call an application programming interface (API) to access system hardware.

Additionally, in embodiments, the CPU and GPU can access any level of memory. However, data from other levels of memory may be stale, while the LLC 114 includes the most recent data. Furthermore, in embodiments, the CPU and GPU can employ any mutually accessible storage location to perform the memory sharing procedure for non-page aligned memory.

The memory 108 contains any number of applications 124 that are configured to run on the computing device 100. In some cases, when an application 124 is executed by CPU 104, the application 124 may request that an allocation 122 be allocated by the device driver 110. The allocation 122 may be a designated portion of physical memory. An allocation is said to be page-aligned if both its base address and size are evenly divisible by the page-size—otherwise it is considered non-aligned.

In some cases, an application 124 may execute on the CPU 102, and request the allocation 122 in order to perform the operations, such as processing data. When an application requests the allocation 122, the operating system may perform a "Probe for Write" operation to check that the application has write permissions to the allocation 122. The probe for write operation may result in the operating system reading and writing to the first byte of each page used by the allocation 122. However, the probe for write operation by the CPU is not atomic and is interruptible. When an allocation is not page-aligned, it does not fully own the pages it partially resides on—and more specifically, if an allocation does not begin on a page boundary, it does not own the first byte of its first page—that can belong to a neighboring allocation. If a non-page-aligned allocation is forced into a probe for write execution path only intended for page-aligned allocations, data corruption can occur when the non-atomic probe for write overwrites data the GPU is writing to the neighboring allocation.

A memory management unit (MMU) 126 may be used to manage access to the pages of data that back the surface 122. The MMU 126 can divide the virtual address space of the CPU 102 and the GPU 104 into various pages of address space. The CPU 102 and the GPU 104 each have their own virtual address spaces. The virtual address space allows for protection of the data contained within the surface 122 by isolating the various applications 124 executing within a computing system to a particular subset of virtual addresses. Through the use of virtual address spaces, one application 124 will not access the data of another application 124. Accordingly, the MMU 126 includes a CPU page table 128 and a GPU page table 130. The CPU page table maps the virtual addresses of the CPU to the physical addresses associated with the allocation 122. Similarly, the GPU page table maps the virtual addresses of the GPU to the physical addresses associated with the allocation 122.

In various embodiments, the virtual memory addresses from the CPU page table 128 and the graphics virtual memory addresses from the GPU page table 130 are mapped to the physical memory pages of the allocation 122. Before the allocation is accessed by the GPU the allocation 122 may be pinned. Pinning the allocation refers to locking the allocation so that the physical locations and the corresponding physical addresses are unchangeable. The pinning may include the operating system performing a "Probe and Lock" operation. Pinning is required where GPUs do not support page faults. Once the GPU has finished accessing the allocation, the pinned allocation can be unlocked and evicted from the page tables. Before the accessing workload is submitted to the GPU, the operating system can probe and lock the surface by reading and writing to the first byte of each involved page which produces the same issue as in 0027 for misaligned allocations. In embodiments described herein, the device driver 110 may synchronize access or manage operations associated with misaligned allocations to avoid the stated issues.

In embodiments described herein, the device driver 110 may synchronize operations by the GPU 104 and the CPU 102, manage misaligned allocations in the driver 110 rather than the operating system, or any combination thereof. The synchronization technique may delay operations, such as allocation creation by the CPU 102, via the operating system, if a related page is currently in the GPU 104 domain. The delay technique may be referred to synchronization, and may avoid corruption of misaligned allocations. Additionally or alternatively, the management technique may manage a misaligned allocation by having the operating system manage only the page-aligned portions of the allocation, and having the driver 110 manage any non-aligned page fragments. These techniques are discussed in more detail below.

The computing device 100 may also include an input/output (I/O) device interface 132. The CPU 102 may be connected through the bus 106 to the input/output (I/O) device interface 132 adapted to connect the computing device 100 to one or more I/O devices 134. The I/O devices 134 may include, for example, a keyboard and a pointing device, wherein the pointing device may include a touchpad or a touchscreen, among others. The I/O devices 134 may be built-in components of the computing device 100, or may be devices that are externally connected to the computing device 100.

The CPU 102 may also be linked through the bus 106 to a display interface 136 adapted to connect the computing device 100 to a display device 138. The display device 138 may include a display screen that is a built-in component of the computing device 100. The display device 138 may also include a computer monitor, television, or projector, among others, that is externally connected to the computing device 100.

A network interface controller (NIC) 140 may be adapted to connect the computing device 100 through the bus 106 to a network 142. The network 142 may be a wide area network (WAN), local area network (LAN), or the Internet, among others.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
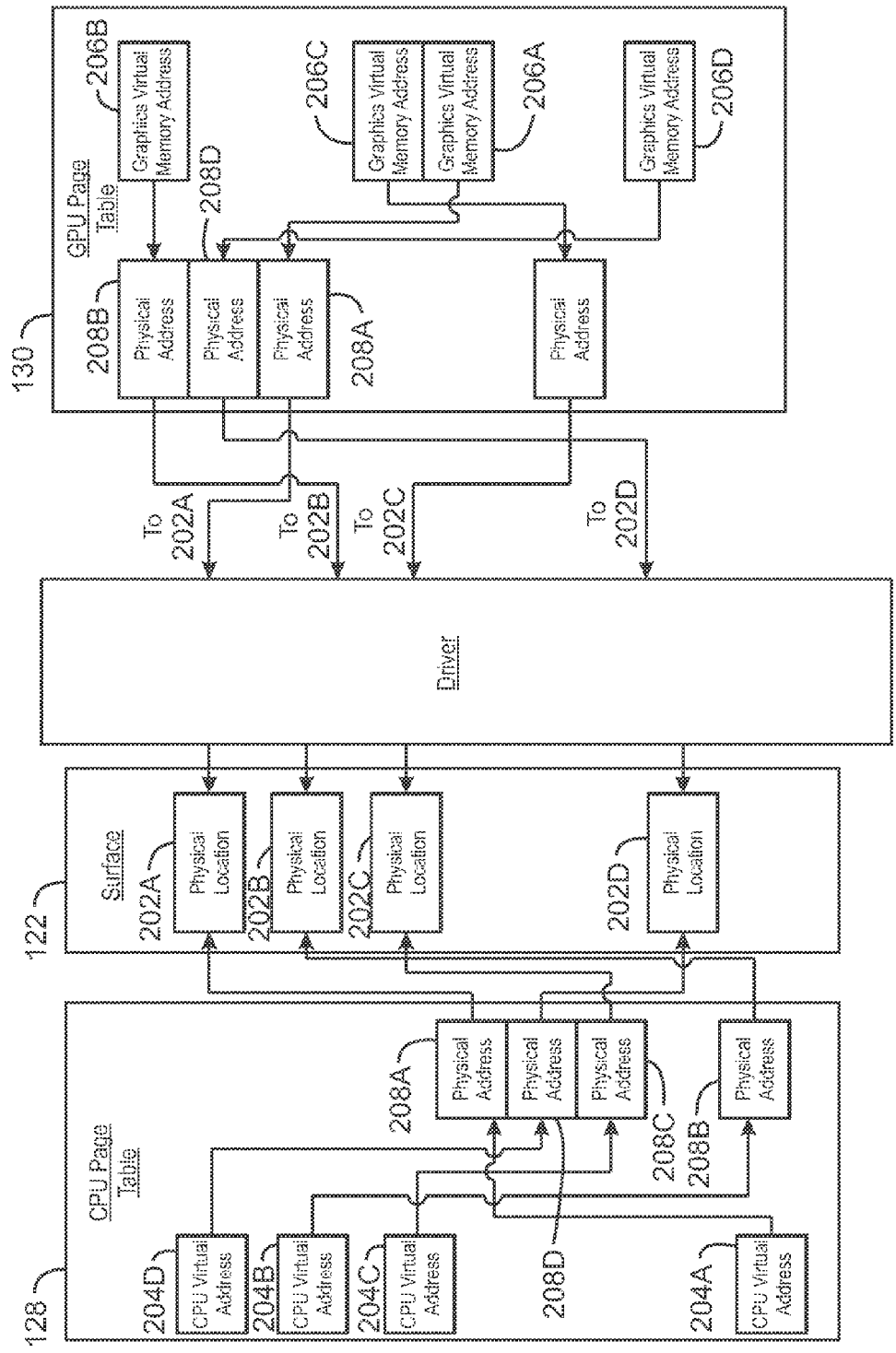
FIG. 2 is a schematic of a unified memory architecture that may be used to implement a procedure for sharing memory between the CPU and the GPU of the computing device, and successfully sharing an allocation, in accordance with embodiments.

FIG. 2 is a schematic of a unified memory architecture 200 that may be used to implement a procedure for sharing memory between the CPU 102 and the GPU 104 of the computing device 100, and reducing corruption in the surface, in accordance with embodiments. Like numbered items are as described with respect to FIG. 1. The UMA 200 may include, for example, the CPU page table 128, the GPU page table 130, and the surface 122 of the computing device 100.

The UMA 200 may enable direct memory sharing between the CPU 102 and the GPU 104 without any type of data copying or data transfer between the CPU 102 and the GPU 104. This may be accomplished by allowing the CPU 102 and the GPU 104 to share the allocation 122.

The CPU page table 128 of the UMA 200 may include a number of CPU virtual memory addresses 204, and the GPU page table 130 may include a number of graphics virtual memory addresses 206. The CPU virtual memory addresses 204 form the CPU virtual address space, while the graphics virtual memory addresses 206 form the graphics virtual address space. Each address space is mapped to a physical address in each page table. For shared allocations, the CPU virtual memory addresses 204 and the graphics virtual memory addresses 206 both map to the same set of physical addresses 208 within the CPU page table 128 and the GPU page table 130, respectively.

The physical addresses 208 enable the CPU 102 and the GPU 104 (FIG. 1) to process data stored at physical locations 202 within the allocation 122. In various embodiments, the allocation 122 is made based on the specific CPU virtual addresses 204 accessed by an application, such as an application 124 discussed in FIG. 1. Once the allocation 122 has been made, each physical address 208 is mapped to a corresponding CPU virtual address 204 within the CPU page table 128, as shown in FIG. 2. The graphics virtual memory addresses 206 within the GPU page table 130 may be synchronized with the CPU page table 128, such that the CPU virtual addresses and the GPU virtual memory addresses are mapped to the same set of physical addresses 208. The physical addresses 208 correspond to physical locations 202 within the allocation 122. Accordingly, the allocation 122 may be directly shared between the CPU 102 and the GPU 104.

As described above, an allocation 122 is associated with one or more pages. If either the base address or size of an allocation is not evenly divisible by the applicable page-size, the allocation is not page-aligned. The device driver 110 may successfully share an unaligned allocation between the CPU and GPU, even if the operating system doesn't naturally support unaligned sharing.

In embodiments, the device driver 110 may monitor the allocation to determine the whether a given surface is associated with an I/O device such as the GPU 104 (FIG. 1) by tracking read or write operations from the GPU 104 to the allocation 122. The device driver 110 may prevent an operating system associated with the CPU 102 from writing to the allocation 122 when the allocation 122 is being written to by the GPU 104. Tracking the association of the GPU 104 to an allocation 122 may be referred to herein as "allocation affinity tracking." In embodiments, allocation affinity may be tracked using mail box writes with unique signatures to track the GPU's 104 state and usage. Every command executed by the GPU 104 is assigned a unique identifier and that identifier is used to track the completion of a command. If a command is not yet complete, the allocation affinity may be in the GPU's 104 domain rather than the CPU's 102 domain. Preventing an operating system associated with the CPU 102 from writing to the allocation 122 when it is in the GPU's 104 domain may reduce the stated issues with sharing non-aligned allocations.

In embodiments, the device driver 110 may reduce the stated issues with sharing non-aligned allocations by reporting only aligned pages to the operating system of the computing device 100. The operating system may restrict the GPU 104 from accessing any misaligned pages. Therefore, any partial pages may be managed by the driver 110, rather than the operating system of the computing device 100. Unlike with an operating system's aligned-only management, the driver 110 may probe, lock and independently manage any misaligned page fragments.

The schematic of FIG. 2 is not intended to indicate that the UMA 200 is to include all of the components shown in FIG. 2. Further, the UMA 200 may include any number of additional components not shown in FIG. 2, depending on the details of the specific implementation.

Figure 3:
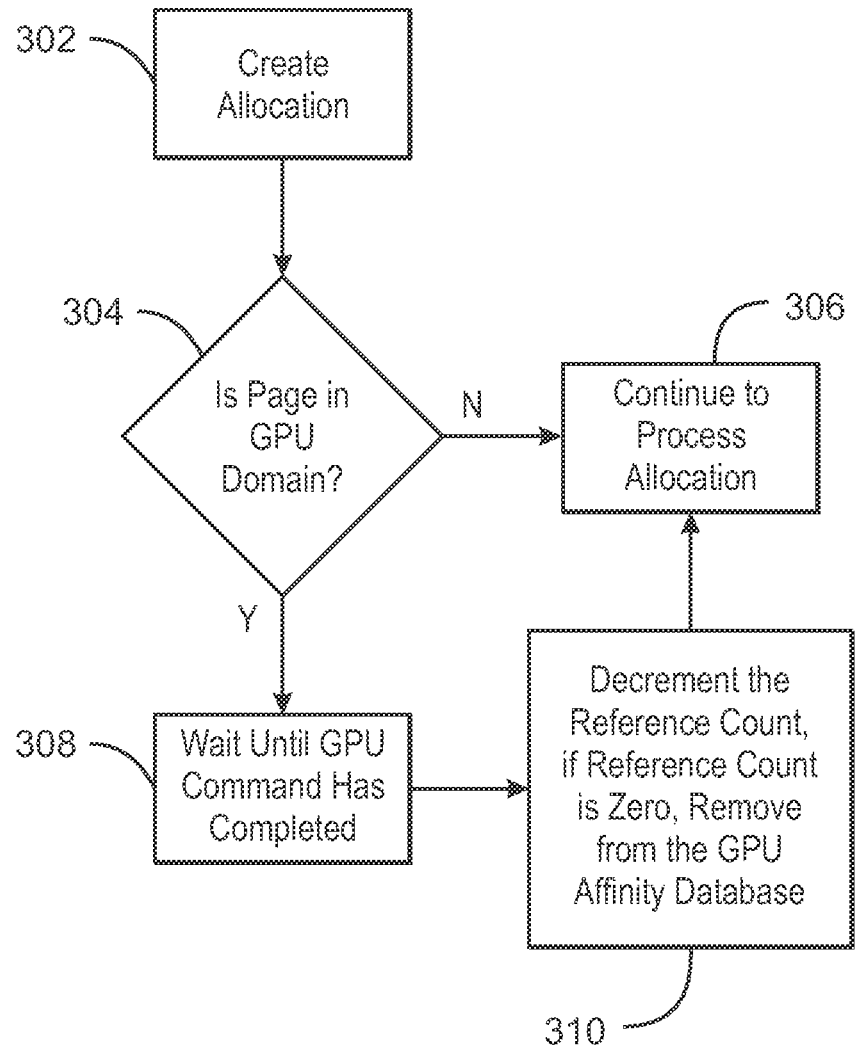
FIG. 3 is a process flow diagram showing a method for tracking surface affinity between the CPU and the GPU of a computing device, in accordance with embodiments.

FIG. 3 is a process flow diagram showing a method 300 for tracking allocation affinity between the CPU and the GPU of a computing device, in accordance with embodiments. In various embodiments, the method 300 is used to overcome aligned-only sharing restrictions from the operating system based on a detection of allocation affinity.

In some embodiments, the method 300 may be executed on a computing device, such as the computing device 100 where the CPU 102 and the GPU 104 are connected by a bus 106. In other embodiments, the CPU 102 and the GPU 104 may be included in a UMA, such as the UMA 200 discussed above with respect to FIG. 2. Further, the method 300 may executed by a driver of the computing device, such as the device driver 110 of the computing device 100.

The method begins at block 302 with creation of an allocation within a physical memory. As discussed above, during allocation creation the operating system may perform a "probe for write" to verify write access to allocation resulting in the aforementioned corruption.

At block 304, a determination may be made as to whether the allocation is in the GPU domain. In embodiments, the determination of whether the allocation is in the GPU domain may be determined by referencing a database configured to store a list of the pages and associated addresses that the GPU is currently working on. The database configured to store the pages and associated addresses that the GPU is currently working on may be referred to herein as the "GPU affinity database."

If the page is not in the GPU domain, at block 306 the allocation may continue. If the page is in the GPU domain, at block 308 the allocation is delayed until the GPU has completed any pending operational commands.

Each address may include pointers to a page referred to as "reference counts." At block 310, once the GPU operational commands have completed the reference count is decremented. If the reference count is greater than zero, then the pages and associated addresses may remain in the GPU affinity database. If the reference count is zero, then the pages and associated addresses may be removed from the GPU affinity database. The allocation may then continue to be processed at 306.

Figure 4:
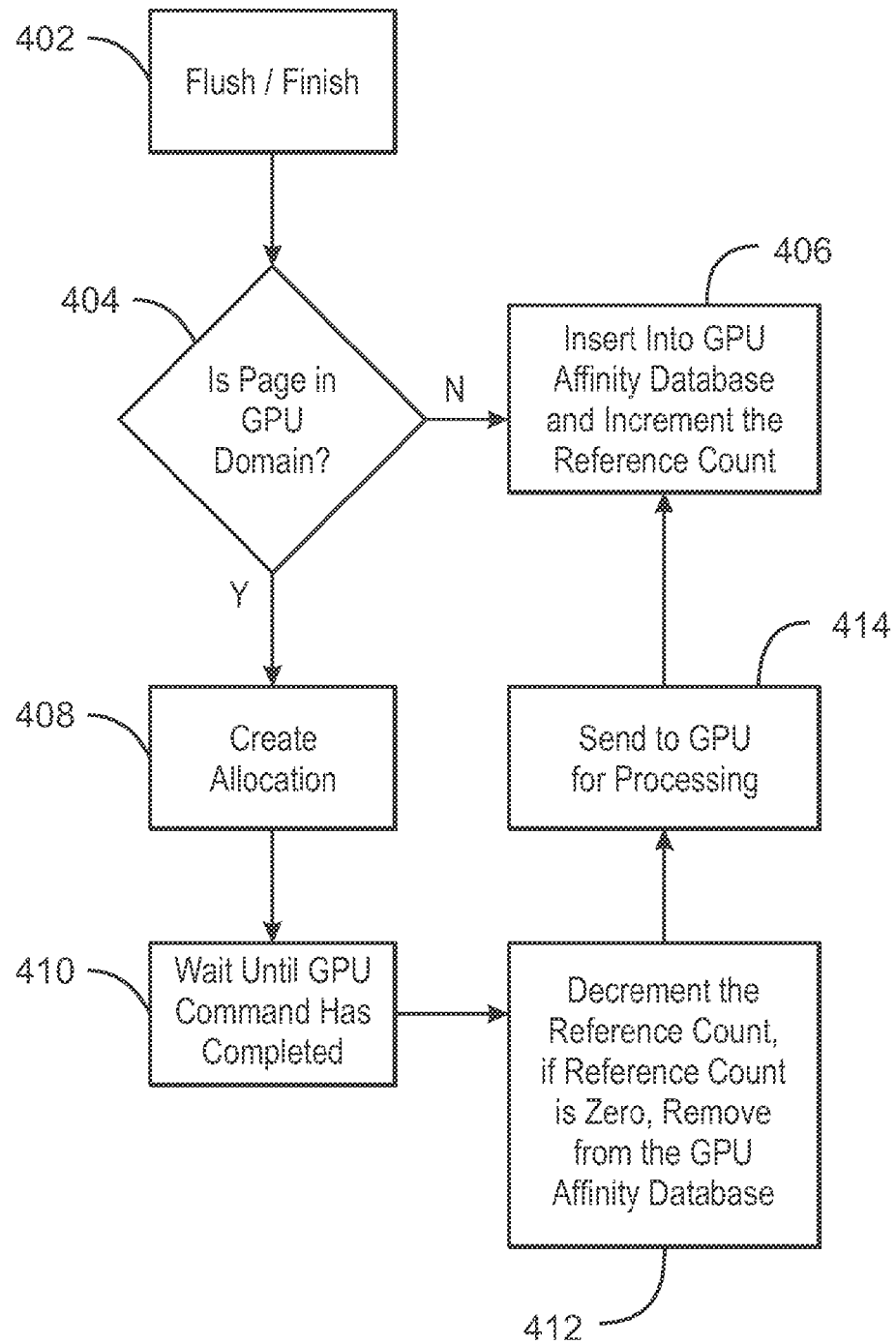
FIG. 4 is a process flow diagram showing a method for tracking surface affinity between the CPU and the GPU of a computing device during a flush operation, in accordance with embodiments.

FIG. 4 is a process flow diagram showing a method 400 for tracking allocation affinity between the CPU and the GPU of a computing device during a flush operation, in accordance with embodiments. In various embodiments, the method 400 is used to track GPU operations in the GPU affinity database.

Before executing a workload at the GPU, everything that the GPU may work on will need to be entered into the GPU affinity database. The method may begin at block 402 by initiating a flush/finish operation indicating allocations to be worked on by the GPU. At block 404 pages associated with the allocation may already be in the GPU domain as a consequence of other operations being associated with the pages. If the page is not in the GPU domain, then the page is provided to the GPU affinity database and the reference count is incremented at block 406. If the page is in the GPU domain then the allocation of the surface is created at block 408. The method 400 may include waiting, at block 410, until the GPU command has completed. Once the GPU command has completed, the reference count is decremented at block 412. Further, if the decremented reference count is zero, the page associated with the surface creation operation that finished at block 410 will be removed from the GPU affinity database. At block 414, the flush/finish operation is provided to the GPU for processing, and addresses associated with the operation is inserted into the GPU affinity database at block 406 incrementing the reference count.

The process flow diagram of FIGS. 3 and 4 are not intended to indicate that the blocks of methods 300 and 400 are to be executed in any particular order, or that all of the blocks are to be included in every case. Further, any number of additional blocks may be included within the methods 300 and 400, depending on the details of the specific implementation. Additionally, while the methods described herein include a GPU, the memory may be shared between any I/O device such as another CPU or a direct memory access (DMA) controller.

Figure 5:
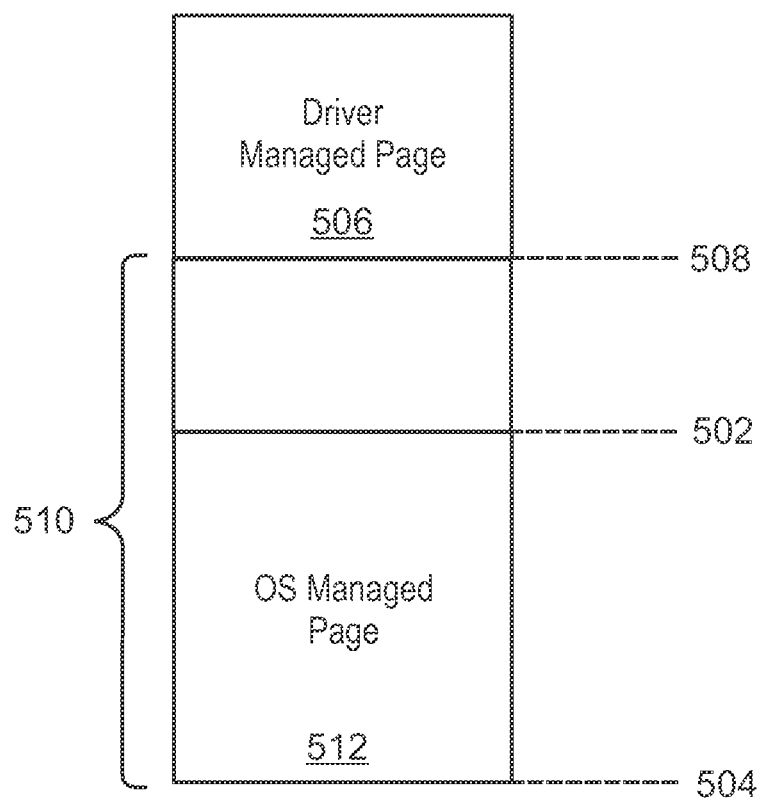
FIG. 5 is a block diagram illustrating pages including misaligned pages managed by either a driver or an operating system.

FIG. 5 is a block diagram illustrating pages including misaligned pages managed by either a driver or an operating system. The pages 500 may be associated with the allocation 122 discussed above in reference to FIG. 2. The pages 500 may include page boundaries 502, 504. In embodiments, a misaligned page, such as the page 506, may include an allocated start address 508 that is offset from the page boundary 502. The driver 110 may report an allocation size 510 determined by the misaligned start address and the last page boundary 502. While the operating system may manage the aligned page 512 having a start address coinciding with the page boundary, the driver manages the misaligned page 506.

In embodiments, the driver 110 may manage misaligned allocations by reporting only aligned pages to the operating system of the computing device. In embodiments, reporting only aligned pages may include increasing the address of a base page to an aligned address of a page next to the base page. For an allocation with start address 508, an increased base page start address 502 may be provided to the operating system. Alternatively, reporting only aligned pages may include reducing a reported allocation size. Although not illustrated in FIG. 5, the limit page may indicate the end of the allocation, such as the boundary 504. The limit page may be provided to the operating system. If, after the above increase/reduction, the reported size would be zero, the driver may have the operating system handle the allocation as a non-shared, single-page allocation—for which the driver will use its own managed shared page in place of the one provided by the operating system.

Figure 6:
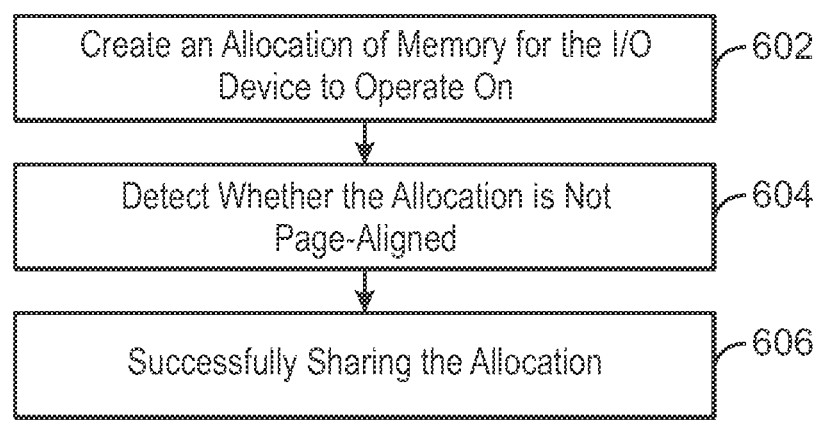
FIG. 6 is a process flow diagram showing a method for reducing corruption of the surface, in accordance with embodiments.

FIG. 6 is a process flow diagram showing a method 600 for reducing corruption of an allocation, in accordance with embodiments. The method 600 may include, at block 602, creating an allocation associated with a page of memory for an I/O device, such as the GPU 104 (FIG. 1), to operate on. At block 604 detection of whether the allocation is misaligned. At block 606, corruption of the allocations are reduced. The corruption may be based on the existence of misaligned allocations.

Figure 7:
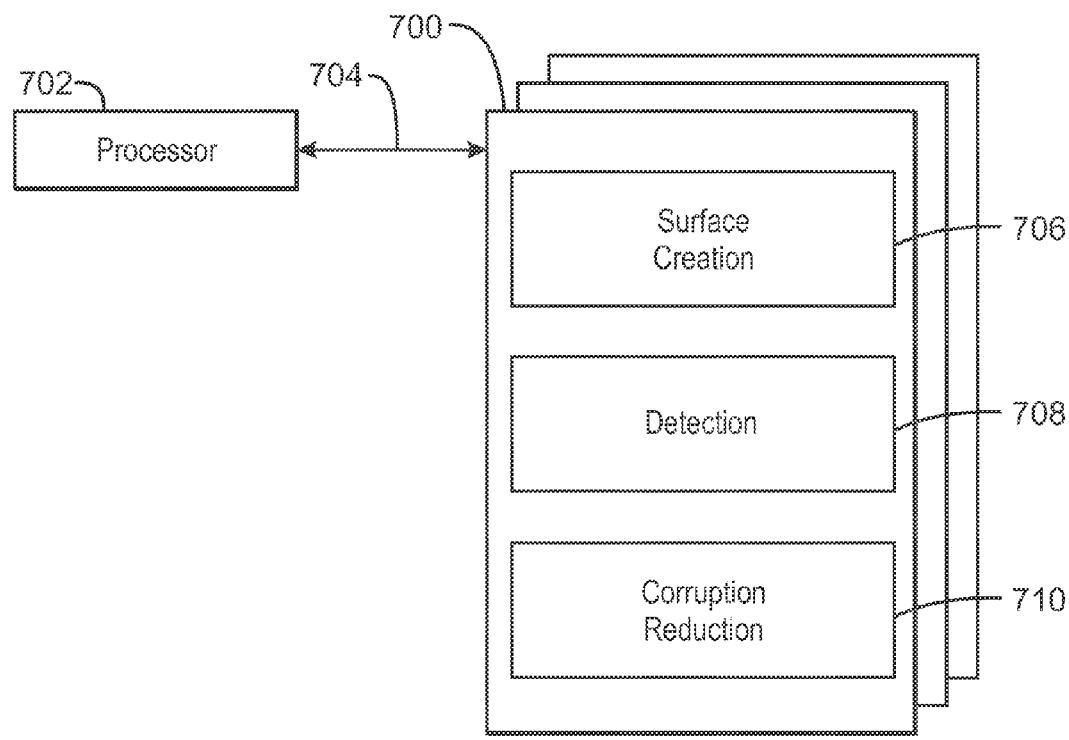
FIG. 7 is a block diagram showing tangible, non-transitory computer-readable media that stores code for sharing memory between the CPU and the GPU of a computing device, in accordance with embodiments.

FIG. 7 is a block diagram showing tangible, non-transitory computer-readable media 700 that stores code for sharing memory between the CPU and the GPU of a computing device, in accordance with embodiments. The tangible, non-transitory computer-readable media 700 may be accessed by a processor 702 over a computer bus 704. Furthermore, the tangible, non-transitory computer-readable media 700 may include code configured to direct the processor 702 to perform the methods described herein.

The various software components discussed herein may be stored on the tangible, non-transitory computer-readable media 700, as indicated in FIG. 7. For example, a surface creation module 706 may be configured to creating an allocation associated with a page of memory for the I/O device to operate on. A detection module 708 may be configured to detecting whether the allocation is not page aligned. Further, a module for handling the misalignment 710 may be configured to reducing corruption of the surface based on the detection.

The block diagram of FIG. 7 is not intended to indicate that the tangible, non-transitory computer-readable media 700 is to include all of the components shown in FIG. 7. Further, the tangible, non-transitory computer-readable media 700 may include any number of additional components not shown in FIG. 7, depending on the details of the specific implementation.

In embodiments, the CPU does not have to marshal data between the CPU address space and the GPU address space. Furthermore, the CPU is not tasked with ensuring that no other processing cores are working on the particular set of data that the CPU wants the GPU to handle, thus preventing processing races between processing cores.

Figure 8:
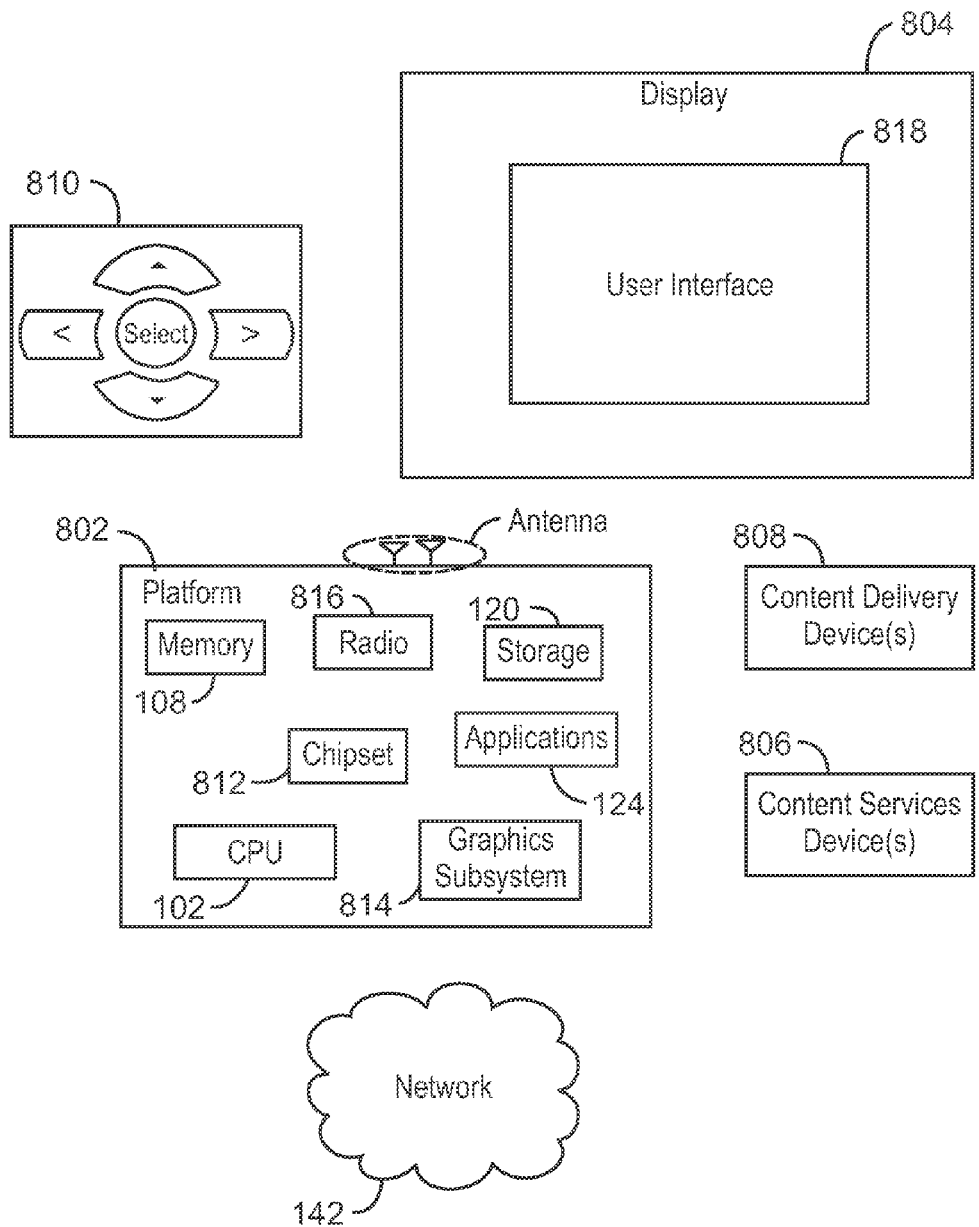
FIG. 8 is a block diagram of an exemplary system for implementing shared physical memory.

FIG. 8 is a block diagram of an exemplary system 800 for implementing shared physical memory. Like numbered items are as described with respect to FIGS. 1 and 2. In some embodiments, the system 800 is a media system. In addition, the system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 800 comprises a platform 802 coupled to a display 804. The platform 802 may receive content from a content device, such as content services device(s) 806 or content delivery device(s) 808, or other similar content sources. A navigation controller 810 including one or more navigation features may be used to interact with, for example, the platform 802 and/or the display 804. Each of these components is described in more detail below.

The platform 802 may include any combination of a chipset 812, a central processing unit (CPU) 102, a memory device 108, a storage device 120, a graphics subsystem 814, applications 124, and a radio 816. The chipset 812 may provide intercommunication among the CPU 102, the memory device 108, the storage device 120, the graphics subsystem 814, the applications 124, and the radio 814. For example, the chipset 812 may include a storage adapter (not shown) capable of providing intercommunication with the storage device 120.

The CPU 102 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 102 includes dual-core processor(s), dual-core mobile processor(s), or the like.

The memory device 108 may be implemented as a volatile memory device such as, but not limited to, a Random Access Memory (RAM), Dynamic Random Access Memory (DRAM), or Static RAM (SRAM). The storage device 120 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 120 includes technology to increase the storage performance enhanced protection for valuable digital media when multiple hard drives are included, for example.

The graphics subsystem 814 may perform processing of images such as still or video for display. The graphics subsystem 814 may include a graphics processing unit (GPU), such as the GPU 104, or a visual processing unit (VPU), for example. An analog or digital interface may be used to communicatively couple the graphics subsystem 814 and the display 804. For example, the interface may be any of a High-Definition Multimedia Interface, DisplayPort, wireless HDMI, and/or wireless HD compliant techniques. The graphics subsystem 814 may be integrated into the CPU 102 or the chipset 812. Alternatively, the graphics subsystem 814 may be a stand-alone card communicatively coupled to the chipset 812.

The graphics and/or video processing techniques described herein may be implemented in various hardware architectures. For example, graphics and/or video functionality may be integrated within the chipset 812. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 816 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 816 may operate in accordance with one or more applicable standards in any version.

The display 804 may include any television type monitor or display. For example, the display 804 may include a computer display screen, touch screen display, video monitor, television, or the like. The display 804 may be digital and/or analog. In some embodiments, the display 804 is a holographic display. Also, the display 804 may be a transparent surface that may receive a visual projection. Such projections may convey various forms of information, images, objects, or the like. For example, such projections may be a visual overlay for a mobile augmented reality (MAR) application. Under the control of one or more applications 124, the platform 802 may display a user interface 818 on the display 804.

The content services device(s) 806 may be hosted by any national, international, or independent service and, thus, may be accessible to the platform 802 via the Internet, for example. The content services device(s) 806 may be coupled to the platform 802 and/or to the display 804. The platform 802 and/or the content services device(s) 806 may be coupled to a network 142 to communicate (e.g., send and/or receive) media information to and from the network 142.

The content delivery device(s) 808 also may be coupled to the platform 802 and/or to the display 804.

The content services device(s) 806 may include a cable television box, personal computer, network, telephone, or Internet-enabled device capable of delivering digital information. In addition, the content services device(s) 806 may include any other similar devices capable of unidirectionally or bidirectionally communicating content between content providers and the platform 802 or the display 804, via the network 142 or directly. It will be appreciated that the content may be communicated unidirectionally and/or bidirectionally to and from any one of the components in the system 800 and a content provider via the network 142. Examples of content may include any media information including, for example, video, music, medical and gaming information, and so forth.

The content services device(s) 806 may receive content such as cable television programming including media information, digital information, or other content. Examples of content providers may include any cable or satellite television or radio or Internet content providers, among others.

In some embodiments, the platform 802 receives control signals from the navigation controller 810, which includes one or more navigation features. The navigation features of the navigation controller 810 may be used to interact with the user interface 818, for example. The navigation controller 810 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combination thereof. Such physical gestures can be recognized and translated into commands or instructions.

Movements of the navigation features of the navigation controller 810 may be echoed on the display 804 by movements of a pointer, cursor, focus ring, or other visual indicators displayed on the display 804. For example, under the control of the applications 124, the navigation features located on the navigation controller 810 may be mapped to virtual navigation features displayed on the user interface 818. In some embodiments, the navigation controller 810 may not be a separate component but, rather, may be integrated into the platform 802 and/or the display 804.

The system 800 may include drivers (not shown) that include technology to enable users to instantly turn on and off the platform 802 with the touch of a button after initial boot-up, when enabled, for example. Program logic may allow the platform 802 to stream content to media adaptors or other content services device(s) 806 or content delivery device(s) 808 when the platform is turned "off." In addition, the chipset 812 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 800 may be integrated. For example, the platform 802 and the content services device(s) 806 may be integrated; the platform 802 and the content delivery device(s) 808 may be integrated; or the platform 802, the content services device(s) 806, and the content delivery device(s) 808 may be integrated. In some embodiments, the platform 802 and the display 804 are an integrated unit. The display 804 and the content service device(s) 806 may be integrated, or the display 804 and the content delivery device(s) 808 may be integrated, for example.

The system 800 may be implemented as a wireless system or a wired system. When implemented as a wireless system, the system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 802 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 8.

Figure 9:
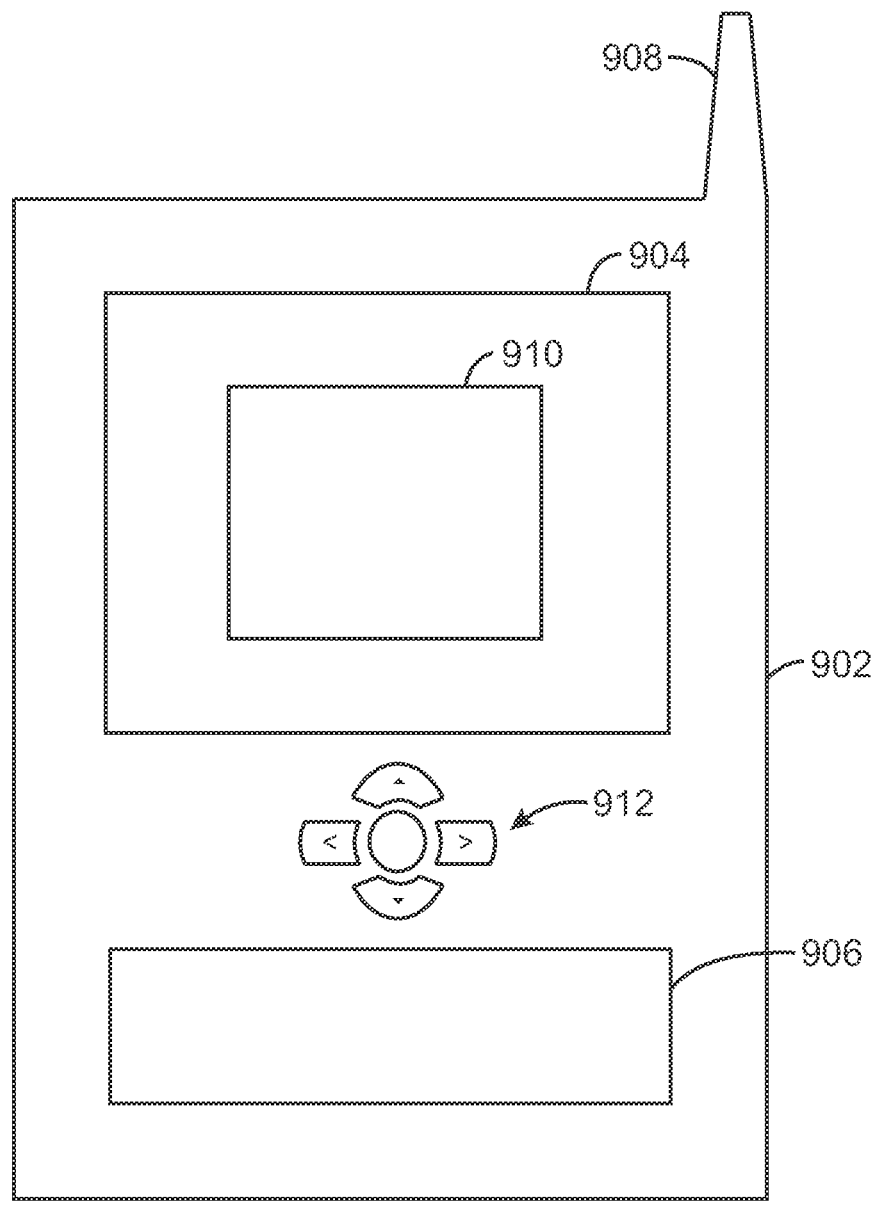
FIG. 9 is a schematic of a small form factor device in which the system of FIG. 8 may be embodied.

FIG. 9 is a schematic of a small form factor device 900 in which the system 800 of FIG. 8 may be embodied. Like numbered items are as described with respect to FIG. 8. In some embodiments, for example, the device 900 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 9, the device 900 may include a housing 902, a display 904, an input/output (I/O) device 906, and an antenna 908. The device 900 may also include navigation features 910. The display 904 may include any suitable display unit for displaying information appropriate for a mobile computing device. The I/O device 906 may include any suitable I/O device for entering information into a mobile computing device. For example, the I/O device 906 may include an alphanumeric keyboard, a numeric keypad, a touch pad, input keys, buttons, switches, rocker switches, microphones, speakers, a voice recognition device and software, or the like. Information may also be entered into the device 900 by way of microphone. Such information may be digitized by a voice recognition device.

EXAMPLE 1

A method for sharing memory between a central processing means (CPM) and graphics processing means (GPM) of a computing device is described herein. For example, the CPM may be a central processing unit (CPU) configured to process memory allocations. The GPM may be a graphics processing unit (GPU) configured to work with the CPM in a unified memory architecture scheme. The method may include creating an allocation of memory for the GPM to operate on and detecting whether the allocation is not page-aligned. An allocation is page-aligned when the base address of the allocation and size of the allocation are evenly divisible by the applicable page-size. The method may include successfully sharing the allocation, even if not page-aligned, and even if an operating system of the computing device doesn't support sharing of non-page-aligned allocations.

EXAMPLE 2

A computing device is described herein. The computing device may include a central processing means (CPM) configured to execute stored instructions, and graphics processing means (GPM) and a GPM page table. For example, the CPM may be a central processing unit (CPU) configured to process memory allocations. The GPM may be a graphics processing unit (GPU) configured to work with the CPM in a unified memory architecture scheme using the GPM page table. The computing device may include a storage means, such as a storage device, including processor executable code that, when executed by the CPM, is configured to create a shared allocation of memory for the GPM to operate on and detect whether the allocation is not page-aligned. An allocation is page-aligned when the base address of the allocation and size of the allocation are evenly divisible by the applicable page-size. The storage means includes processor executable code that, when executed by the CPM, is configured to share the allocation, even if not page-aligned, and even if an operating system of the computing device doesn't support sharing of non-page-aligned allocations.

EXAMPLE 3

At least one machine readable medium is described herein. The at least one machine readable medium having instructions stored therein that, in response to being executed on a computing device, cause the computing device to create a shared memory allocation for a general processing unit (GPU) to operate on, and detect whether the allocation is not page-aligned. The instructions may cause the computing device to share the allocation, compensating for any lack of operating system support for non-aligned sharing, based on the detection.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method for sharing memory between a central processing unit (CPU) and graphics processing unit (GPU) of a computing device, comprising:
   creating an allocation of memory of one or more pages for the GPU to operate on;
   determining whether the allocation is in a GPU domain by referencing a GPU affinity database, wherein creating of the allocation continues if the one or more pages are not in the GPU domain, and wherein creating of the allocation is delayed until the GPU has completed any pending operational commands if the one or more pages are in the GPU domain;
   detecting whether the allocation is not page-aligned, wherein an allocation is page-aligned when a base address of the allocation and size of the allocation are evenly divisible by the applicable page-size; and
   successfully sharing the allocation, even if not page-aligned, and even if an operating system of the computing device doesn't support sharing of non-page-aligned allocations.

2. The method of claim 1, wherein successfully sharing the allocation comprises:
   determining whether a write operation to the allocation is being performed by the GPU, and, if so,
   preventing an operating system associated with the CPU from writing to the allocation.

3. The method of claim 2, wherein determining whether the write operation is being performed by the GPU comprises tracking operations of the GPU having unique identifiers indicating progress of the write operation.

4. The method of claim 1, wherein successfully sharing the allocation comprises:
   reporting for sharing only aligned pages of the allocation to an operating system of the computing device; and
   managing allocation of non-aligned page fragments within a driver.

5. The method of claim 4, wherein managing the non-aligned page fragments comprises probe and locking any misaligned page fragments rather than forcing the fragments into the operating system's aligned-only management.

6. The method of claim 4, wherein managing the non-aligned allocation comprises:
increasing a reported base page to a following page boundary;
reducing a reported size to a lesser, page-aligned size;
using a driver-managed page in place of one provided by the operating system; or
any combination of the above.

7. The method of claim 4, wherein managing the misaligned allocation comprises reporting to the operating system a physical size associated with the misaligned allocation as relatively less than the physical size associated with the misaligned allocation.

8. The method of claim 1, wherein the method is performed by a driver of the GPU, wherein the driver synchronizes the processing of misaligned data between the CPU and the GPU.

9. A computing device, comprising:
a central processing unit (CPU) that is configured to execute stored instructions;
a graphics processing unit (GPU) and a GPU page table;
a storage device that stores instructions, the storage device comprising processor executable code that, when executed by the CPU, is configured to:
create a shared memory allocation of one or more pages for the GPU to operate on;
determine whether the shared memory allocation is in a GPU domain by referencing a GPU affinity database, wherein creation of the shared memory allocation continues if the one or more pages are not in the GPU domain, and wherein creation of the shared memory allocation is delayed until the GPU has completed any pending operational commands if the one or more pages are in the GPU domain;
detect whether the allocation is not page-aligned, wherein an allocation is page-aligned when a base address of the allocation and size of the allocation are evenly divisible by the applicable page-size; and
share the allocation, compensating for any lack of operating system support for non-aligned sharing, based on the detection.

10. The computing device of claim 9, wherein sharing the allocation comprises:
determining whether a write operation to the allocation is being performed by the GPU, and, if so,
preventing an operating system associated with the CPU from writing to the allocation.

11. The computing device of claim 10, wherein determining whether the write operation is being performed by the GPU comprises tracking operations of the GPU having unique identifiers indicating progress of the write operation.

12. The computing device of claim 9, wherein sharing the allocation comprises:
reporting for sharing only aligned pages to an operating system of the computing device; and
managing allocation of misaligned page fragments at a driver.

13. The computing device of claim 12, wherein managing the non-aligned page fragments comprises probe and locking any misaligned page fragments rather than forcing the fragments into the operating system's aligned-only management.

14. The computing device of claim 12, wherein managing the non-aligned allocation comprises:
increasing a reported base page to a following page boundary;
reducing a reported size to a lesser, page-aligned size;
using a driver-managed page in place of one provided by the operating system; or
any combination of the above.

15. The computing device of claim 12, wherein managing the misaligned allocation comprises
reporting to the operating system a physical size associated the misaligned allocation as relatively less than the physical size associated with the misaligned allocation.

16. The computing device of claim 9, wherein the instructions are performed by a driver of the GPU, wherein the driver synchronizes the processing of misaligned data between the CPU and the GPU.

17. The computing device of claim 9, wherein the CPU and the GPU comprise an unified memory architecture (UMA).

18. At least one non-transitory machine readable medium having instructions stored therein that, in response to being executed on a computing device comprising a central processing unit (CPU), cause the computing device to:
create a shared memory allocation of one or more pages for a graphics processing unit (GPU) to operate on;
determine whether the shared memory allocation is in a GPU domain by referencing a GPU affinity database, wherein creation of the shared memory allocation continues if the one or more pages are not in the GPU domain, and wherein creation of the shared memory allocation is delayed until the GPU has completed any pending operational commands if the one or more pages are in the GPU domain;
detect whether the allocation is not page-aligned, wherein an allocation is page-aligned when a base address of the allocation and size of the allocation are evenly divisible by the applicable page-size; and
share the allocation, compensating for any lack of operating system support for non-aligned sharing, based on the detection.

19. The at least one non-transitory machine readable medium of claim 18, wherein sharing the allocation comprises:
determining whether a write operation to the allocation is being performed by the GPU, and, if so,
preventing an operating system associated with the CPU from writing to the allocation.

20. The at least one non-transitory machine readable medium of claim 19, wherein determining whether the write operation is being performed by the GPU comprises tracking operations of the GPU having unique identifiers indicating progress of the write operation.

21. The at least one non-transitory machine readable medium of claim 18, wherein successfully sharing the allocation comprises:
reporting for sharing only aligned pages of the allocation to an operating system of the computing device; and
managing allocation of non-aligned page fragments within a driver.

* * * * *